United States Patent [19]
Kalns

[11] 4,275,617
[45] Jun. 30, 1981

[54] HYDRAULIC SYSTEM FOR A RATIO CHANGE TRANSMISSION

[75] Inventor: Ilmars Kalns, Northville, Mich.

[73] Assignee: Eaton Corporation, Cleveland, Ohio

[21] Appl. No.: 51,575

[22] Filed: Jun. 25, 1979

[51] Int. Cl.³ .......................... F16H 3/44; F16H 47/00
[52] U.S. Cl. .................................... 74/750 R; 74/732; 74/751; 74/DIG. 1
[58] Field of Search ..................... 74/750, 751, 752 C, 74/781 R, 754, 763, 762, 467, 732, DIG. 1; 184/6.12

[56] References Cited

U.S. PATENT DOCUMENTS

| | | | |
|---|---|---|---|
| 3,319,492 | 5/1967 | Magnuson | 74/750 R |
| 4,123,952 | 11/1978 | Wayman | 74/750 R X |
| 4,128,023 | 12/1978 | Kinder | 74/750 R |

OTHER PUBLICATIONS

"New Valve Mechanism", Automotive Industries, 3-1-53, pp. 24-27, 84.

Primary Examiner—C. J. Husar
Attorney, Agent, or Firm—R. J. McCloskey; D. Wood; P. Rulon

[57] ABSTRACT

Disclosed is a drive assembly (10) for an electrically powered vehicle (12). The assembly includes a transaxle (16) having a two-speed transmission (40) and a drive axle differential (46) disposed in a unitary housing assembly (38), an oil-cooled prime mover or electric motor (14) for driving the transmission input shaft (42), an adapter assembly (24) for supporting the prime mover on the transaxle housing assembly, and a hydraulic system (172) providing pressurized oil flow for cooling and lubricating the electric motor and transaxle and for operating a clutch (84) and a brake (86) in the transmission to shift between the two-speed ratios of the transmission. The adapter assembly allows the prime mover to be supported in several positions on the transaxle housing. The brake is spring-applied and locks the transmission in its low-speed ratio should the hydraulic system fail. The hydraulic system pump is driven by an electric motor (212) independent of the prime mover and transaxle.

11 Claims, 6 Drawing Figures

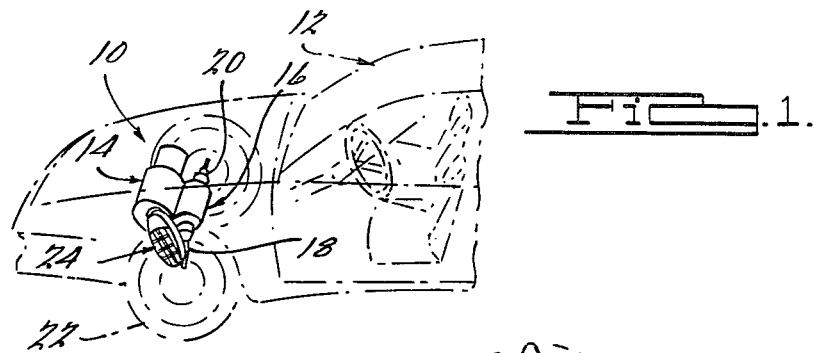
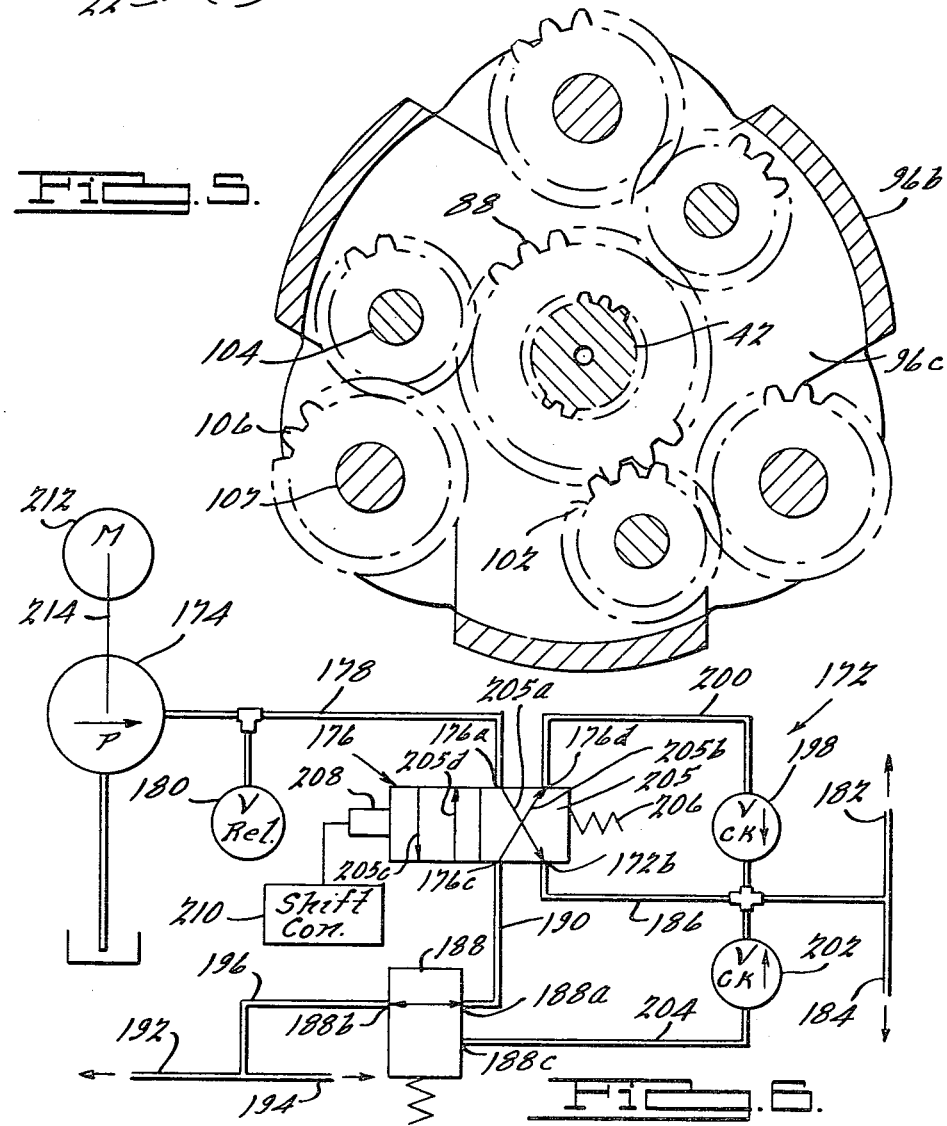

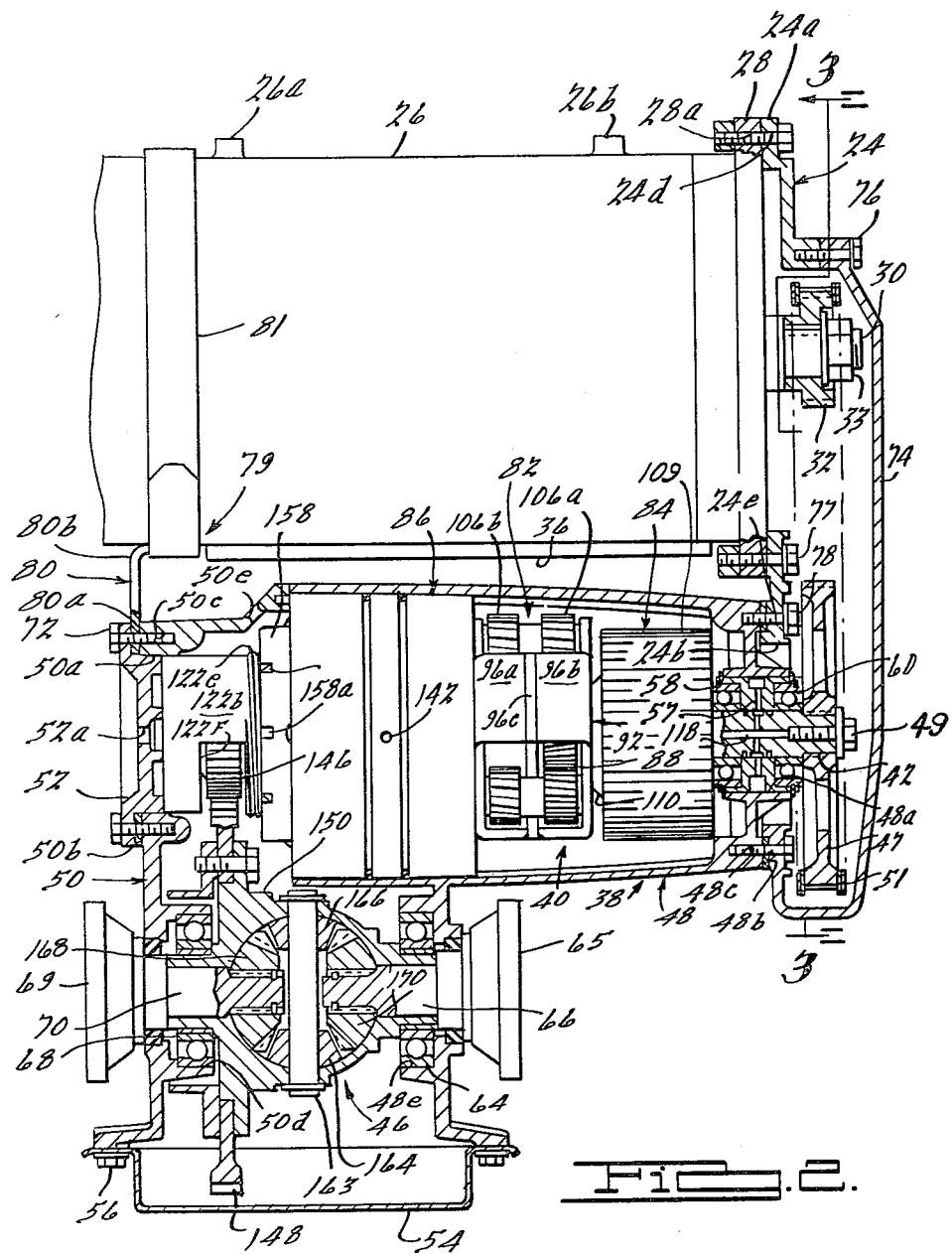

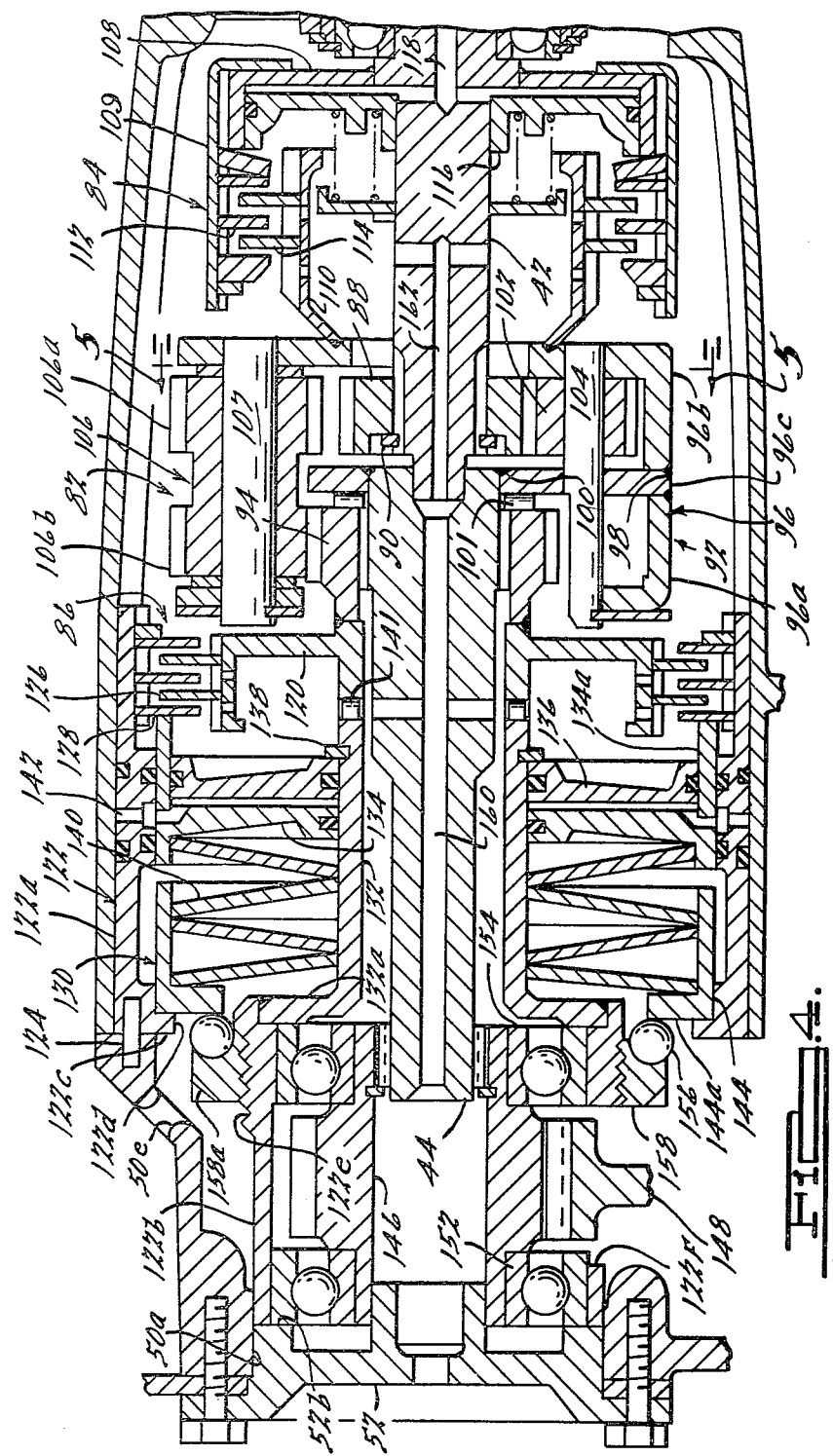

HYDRAULIC SYSTEM FOR A RATIO CHANGE TRANSMISSION

CROSS-REFERENCE TO RELATED APPLICATIONS

This application is related to U.S. patent application Ser. Nos. 051,576 and 051,577, both filed June 25, 1979 and assigned to the assignee of this application.

FIELD OF THE INVENTION

The invention relates to a hydraulic system for a ratio change transmission and, in particular, to a hydraulic system which operates at a reduced oil pressure when the transmission is in one ratio and at a higher pressure when the transmission is in another ratio.

BACKGROUND OF THE INVENTION

It is well-known in the ratio change transmission art to provide a hydraulic or pressurized oil system for lubricating and cooling the transmission and for selectively or automatically actuating mechanisms, i.e., clutches and/or brakes, to shift the transmission gearing from one speed ratio to another. These prior art hydraulic systems normally include an oil pump which is traditionally driven by the transmission input or output shaft. When so driven, the pump provides no oil flow when the driving shaft stops and inefficiently provides less than or more than the desired oil flow depending on the driving shaft speed. Further, when the pump is running, it has to continuously and inefficiently pump oil at a pressure great enough to actuate the clutches and/or brakes.

SUMMARY OF THE INVENTION

An object of this invention is to provide an efficient hydraulic system for a ratio change transmission.

According to a feature of the invention, the hydraulic system includes a pump which provides an oil flow for lubricating and cooling a transmission and for operating ratio change mechanisms in the transmission. When the transmission is in one speed ratio, the pump provides the oil flow along a first path at a relatively low pressure and when the transmission is to be shifted to another speed ratio, the pump provides the oil flow along a second path at a greater pressure.

According to another feature of the invention, the pump is driven at a rotational speed independent of the rotational speed of the transmission shafts and gearing.

BRIEF DESCRIPTION OF THE DRAWINGS

The disclosed embodiment of the invention is shown in the accompanying drawings in which:

FIG. 1 is a partial view of a vehicle having a drivetrain assembly according to or incorporating the invention herein;

FIG. 2 is a partial section of the drivetrain assembly of FIG. 1, looking along line 2—2 of FIG. 3;

FIG. 4 is a sectional view of another portion of the drivetrain assembly looking along a portion of line 2—2 of FIG. 3;

FIG. 5 is a sectional view of another portion of the drivetrain assembly looking along line 5—5 of FIG. 4; and FIG. 6 is a schematic view of a hydraulic system for the drivetrain assembly.

DETAILED DESCRIPTION OF THE DRAWINGS

Figure 3:
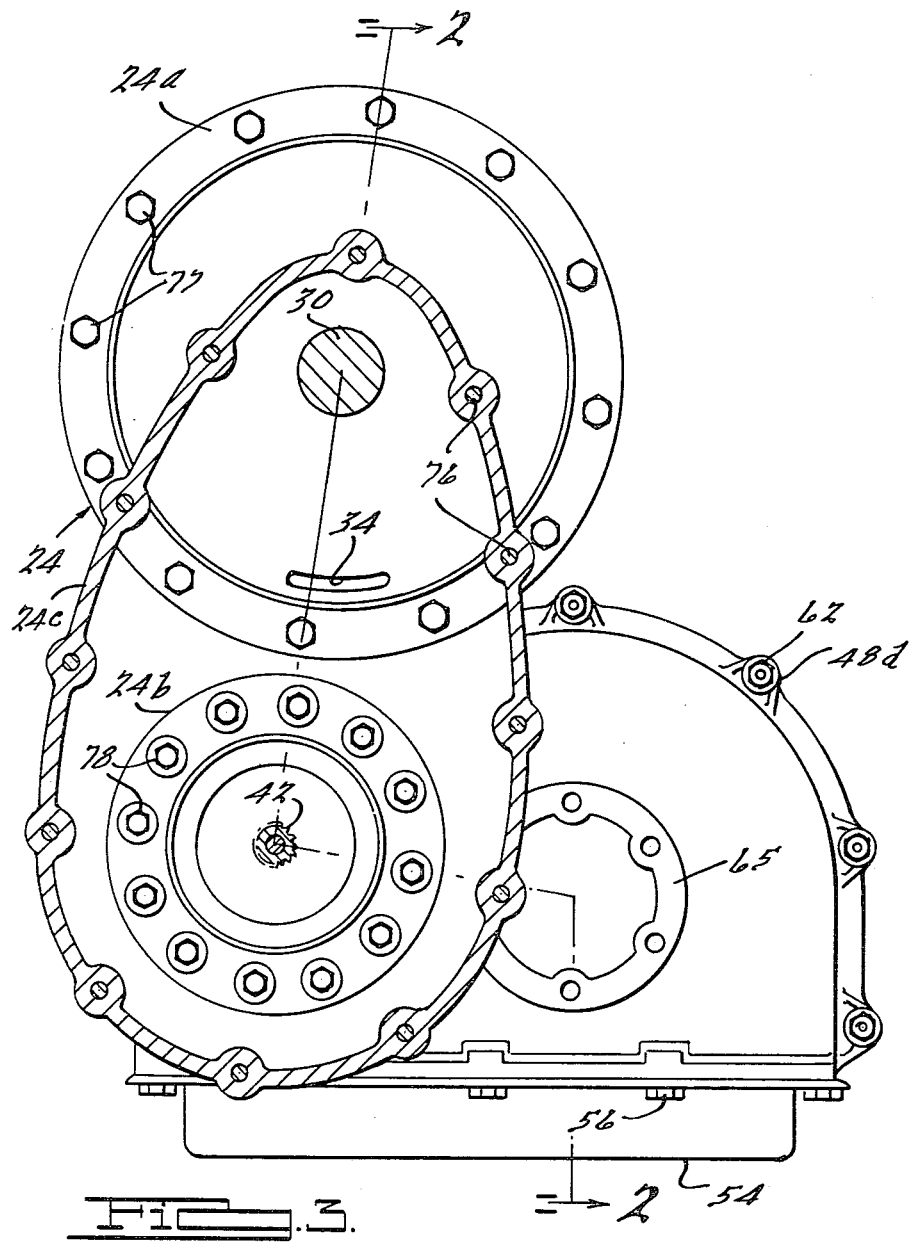
FIG. 3 is a sectional view of a portion of the drivetrain assembly looking along line 3—3 of FIG. 2.

Referring now to FIG. 1, therein is shown a drive assembly 10 for powering a partially shown vehicle 12. The assembly may power the front wheels of the vehicle, as shown, and/or the rear wheels. Details of the driving connections to the vehicle wheels are not shown since such details are well-known. Assembly 10 includes a prime mover 14, a transaxle assembly 16 having driveshafts 18 and 20 adapted to be drivingly coupled to front wheels 22, and an adapter assembly 24 for supporting the prime mover on the transaxle assembly in any of several positions.

The prime mover 14, as disclosed herein, is an electric motor driven by a source of electrical energy regulated by a control system. The source and the control system are both unshown, and neither forms a part of the instant invention. The transaxle, as disclosed, provides two speed ratios, a low speed ratio and a high speed ratio. Additional ratios are believed to be within the spirit of the invention and are readily added if desired. The control system, as contemplated, drives the motor in one direction for forward vehicle motion and in the other direction for reverse vehicle motion.

Looking now at FIGS. 2, 3, and 4, prime mover 14 is preferably, but not necessarily, an electric motor which may be any of several well-known types and makes. Herein the preferred motor is an alternating current motor marketed by the Industrial Drives Division of Eaton Corporation. The motor is rated at 25 horsepower and is lubricated and cooled by an oil also used to lubricate and cool the transaxle assembly. The motor includes a cylindrical housing 26, a mounting flange 28, and an output shaft 30 having a chain drive sprocket 32 fixed at one end thereof by a nut 33. Shaft 30 is rotatably supported by the housing in unshown bearings, and carries thereon a low inertia rotor or armature which is also unshown. Oil for lubricating and cooling the motor flows into the housing via inlet ports 26a and 26b at the top of the housing. The oil flows out of the lower right end of the housing, as viewed in FIG. 2, via gravity flow through an unshown outlet passage having an arcuate opening 34 shown in FIG. 3. Gravity flow of oil from the left end of the housing to the right end is provided by a trough 36 at the bottom of the housing. Since oil flows out of the housing by gravity, it is important to position the motor housing in the vehicle with the axis of shaft 30 substantially horizontal and with trough 36 vertically below the shaft. Mounting flange 28 extends radially outward from the housing and includes a plurality of (herein twelve) equally spaced and circumferentially disposed bolt holes 28a forming a ring concentric to the rotational axis of shaft 30.

The transaxle assembly 16 includes a housing assembly 38, a ratio change transmission assembly 40 having input and output shafts 42 and 44 (see FIG. 4) disposed about a common axis, and a differential gear assembly 46. A chain drive sprocket 47 is splined to shaft 42 and retained thereon via a bolt 49. Sprockets 32 and 47 are drivingly connected together via a chain 51, which chain is shown in phantom lines between the sprockets. The housing assembly 38 includes a housing member 48 encasing most of the transmission assembly and about half of the differential assembly, a housing member 50 encasing the left end of the transmission assembly and the other half of the differential assembly, an end cap 52, and an oil pan 54 secured to members 48 and 50 via a plurality of bolts 56. The right end wall of member 48 includes an opening or throughbore 48a supporting an annular distributor 57 for directing pressurized oil into a portion of the transmission and also for carrying a pair of ball bearings 58 and 60 which rotatably support input shaft 42. The right end of housing member 48 further includes an axially facing mounting flange 48b having a plurality of (herein twelve) equally spaced and circumferentially disposed bolt holes 48c forming a ring concentric to the rotational axis of shaft 42. The left end of member 48 includes a plurality of bosses 48d (see FIG. 3) for securing members 48 and 50 together via bolts 62, and a stepped opening 48e carrying a ball bearing 64 which rotatably supports a differential output shaft 66 adapted to be connected to driveshaft 18 via a flange 65. The left end of member 50 includes an opening or throughbore 50a concentric to the rotational axis of output shaft 44, an axially facing mounting flange 50b having a plurality of (herein twelve) equally spaced and circumferentially disposed bolt holes 50c forming a ring concentric to the rotational axis of shaft 44, and a stepped opening 50d carrying a ball bearing 68 which rotatably supports another differential output shaft 70 adapted to be connected to driveshaft 20 via a flange 69. End cap 52 is secured to member 50 via a plurality of bolts 72 and includes an opening 52a for admitting lubrication oil into the transmission, and an axially facing abutment flange 52b.

Looking now at FIGS. 2 and 3, adapter member 24 provides a structure for rigidly securing the motor housing to the transmission housing, for fixing the radial distance between the motor shaft 30 and the transmission shaft 42, for positioning the shafts parallel to each other, and for varying the clock position of the motor relative to the transmission input shaft. Member 24 is preferably, but not necessarily, formed by metal casting. The member includes annular flanges 24a and 24b, arranged in figure eight fashion with respect to each other and a teardrop-shaped flanged 24c which provides a mounting flange for securing a cover 74 to member 24 via a plurality of bolts 76. Flanges 24a and 24b each include a plurality of equally spaced and circumferentially disposed bolt holes 24d and 24e (herein twelve in each) alignable with their respective bolt holes 28a and 48c for securing the housings together via bolts 77 and 78. The equally spaced bolt holes and bolts form fastener means to facilitate mounting of the motor in several positions in 30 degree increments relative to the transmission input shaft 42. Of course, the number of degrees in each increment may be varied by either increasing or decreasing the number of fastener means. In FIG. 3, the motor is shown in a clocked position almost directly above shaft 42. From this clocked position, the motor may be repositioned in a counterclockwise direction relative to shaft 42 in 30 degree increments by merely reindexing flanges 24b and 48b relative to each other. In order to maintain arcuate opening 34 at the bottom of the motor for gravity flow of cooling oil, motor flange 28 may be reindexed in 30 degree increments relative to flang 24a.

The left end of motor housing 26 is supported by a clamp assembly 79 including a member 80 having a ring portion 80a secured between cover 52 and mounting flange 50b, and a strut portion 80b which is formed at its end adjacent to the motor housing into an arcuate shape cradling the motor housing and clamped thereto via a strap 81. When the motor is repositioned with respect to the transaxle, strap 81 is loosened and ring portion 80a reindexed with respect to mounting flange 50b.

Looking now at the ratio change assembly 40 in FIGS. 2, 3, and 4, therein is a planetary gear set 82, a friction clutch 84, and a friction brake 86. Looking briefly of FIGS. 2, 4, and 5, the planetary gear set is of the Ravigneaux type and includes an input gear member 88 splined to input 42 and retained thereon via a suitable fastener 90, an output assembly 92, and a reaction gear member 94 journaled for rotation on output shaft 44. Output assembly 92 includes an output member 96 having end portions 96a and 96b and a center portion 96c which is welded to the end portions at 98 and to output shaft 44 at 100. Axial spacing and thrust between reaction gear 94 and center portion 96c is controlled by a roller bearing 101. Assembly 92 further includes three planet gears 102 in mesh with input gear 88 and rotatably supported on shafts 104 carried by member 96, and three double planet gears 106 supported on shafts 107 carried by member 96. Double planet gears 106 each include a gear portion 106a in mesh with gear 102 and a gear portion 106b in mesh with reaction gear 94.

Friction clutch 84 may be of any well-known design. The clutch includes a radially extending input member 108 welded to input shaft 42, a drum member 109 welded to member 108, an output member 110 welded to member 96b of the planetary gear set, a plurality of interleaved friction discs 112 and 114 respectively fixed to members 109 and 110, and a hydraulic piston 116 operative to squeeze the discs together and apply the clutch in response the presence of pressurized fluid ported thereto via distributor 57 and passages 118 in shaft 42. When clutch 84 is applied, input shaft 42 is locked to member 96, thereby preventing relative rotation between input gear 88 and output assembly 92 and thereby effecting a direct or one-to-one drive ratio through the planetary gear set. When clutch 84 is released, the input gear and output assembly of the gear set are free to rotate relative to each other.

Friction brake 86 includes a rotatable member 120 welded to reaction member 94, a grounded member 122 having an annular portion 122a fixed against rotation relative to the housing assembly via one or more pins 124, interleaved friction discs 126 and 128 respectively fixed to member 120 and annular portion 122a, and an actuating and adjusting assembly 130. Assembly 130 includes an annual portion 122b integrally formed with annular portion 122a and connected thereto via a radially extending portion 122c having a plurality of holes 122d therein, an annular member 132 having a radially extending wall portion 132a welded to member 122 at the intersection of portions 122b and 122c, an annular piston 134 having an annular portion 134a extending axially toward discs 126 and 128 and forming in combination with annular member 132 an annular piston chamber sealed at its right end by an annular end wall 136 retained by a snap ring 138, and a spring pack composed of a plurality of Bellville springs 140 operative to bias piston 134 rightward and squeeze discs 126 and 128 together to apply the brake via the axially extending portion 134a. Axial spacing and thrust between members 120 and 132 are controlled by a roller bearing 141. The brake may be released by porting pressurized fluid into the piston chamber via passages 142. The spring pack reacts at its leftward end against a radially extending flange portion 144a of an annular member 144 disposed for axial movement. Annular portion 122b, which encircles an output gear 146 splined to outlet shaft 44, includes a threaded portion 122e and a cutout portion 122f to allow meshing engagement of gear 146 with a ring gear 148 bolted to a differential housing 150. The left end of annular portion 122b extends into bore 50a for support by housing member 50 and abuts flange 52b of end cap 52 for axially positioning the ratio change assembly in the housing. Portion 122b in turn supports a pair of ball bearings 152 and 154 which journal gear 146.

The adjusting portion of assembly 130 includes a plurality of balls 156 disposed in the plurality of holes 122d and reacting between flange portion 144a and a nut 158 screwed on threaded portion 122e. Nut 158 includes a plurality of detents operative to partially receive the balls for locking the nut in a selected position. A set of teeth or castellations 158a, defined on the outer diameter of the nut, receive an unshown adjusting tool insertable through a slotted opening 50e. The tool is operative to rotate the nut to and fro in response to pivotal movement of the tool about the walls of the slotted opening.

Lubrication of the brake, clutch, and gear set flows through shafts 44 and 42 via passages 160 and 162 which receive oil from port 52a in cover 52.

Differential 46, which may be of several well-known designs, includes the ring gear 148, the housing 150 journaled in the bearings 64 and 68, a pinion shaft 163 fixed to housing 150, a pair of pinion gears 164 and 166, and side gears 168 and 170 in mesh with the pinions and splined, respectively, to shafts 66 and 70.

Looking now at FIG. 6, therein is schematically illustrated a hydraulic system 172 operative to provide pressurized oil or fluid to lubricate and cool motor 14 and transaxle 16 and to provide pressurized oil or fluid to selectively apply clutch 84 and release spring applied brake 86. The system includes a pump 174, a two position valve 176 connected at a port 176a to pump 174 via a conduit 178, a high pressure relief valve 180 teed into conduit 178, conduits 182 and 184 for directing lubricating and cooling oil to the prime mover and transaxle via a conduit 186 connected to a port 176b of valve 176, a pressure regulating valve 188 having a port 188a connected to a port 176c of valve 176 via a conduit 190, conduits 192 and 194 for directing pressurized oil to apply clutch 84 and release brake 86 via a conduit 196 connected to a port 188b of valve 188, a check valve 198 connected on one side to a port 176d of valve 176 via a conduit 200 and on the other side to conduit 186, and a check valve 202 connected on one side to a port 188c of valve 188 via a conduit 204 and on the other side to conduit 186. By way of example, conduit 182 may be connected to motor ports 26a and 26b, conduit 184 may be connected to opening 52a, conduit 192 may be connected to clutch 84 via the passages in distributor 57, and conduit 194 may be connected to brake 86 via passages 142.

Valve 176 includes a two position valving member or spool 205 biased to the position shown via a spring 206 and moveable to its second position in response to actuation of a solenoid 208 by an electrical signal from a shift control 210. When spool 205 is in the position shown, a passage 205a interconnects ports 176a and 176b, and a passage 205b interconnects ports 176c and 176d. When spool 205 is in its second position, passage 205c interconnects ports 176a and 176c, and a passage 205d interconnects ports 176b and 176d. The shift control may be manually controlled by a vehicle operator or automatically controlled by sensed operating parameters of the vehicle, e.g., vehicle speed and power demand. When spool 205 is in the position shown, all of the oil flows along a path defined by conduit 178, passage 205a, conduits 186, 182 and 184 and the lubricating and cooling passages in the prime mover motor and the transaxle. This path offers relatively little resistance to the oil flow; hence, the oil pressure is relatively low and the amount of energy required to drive the pump is relatively low. Further, no oil flows to the piston chambers of clutch 84 and brake 86 since check valves 198 and 202 block oil flow from conduit 186 into conduits 200 and 204. Hence, the planetary gear set is in its low speed ratio mode since clutch 84 is released and brake 86 is spring applied. This arrangement has the advantage of automatically ensuring or keeping the transaxle in a drive or come-home gear ratio should the hydraulic system fail in any of several modes which would cause a loss of oil pressure.

When spool 205 is moved to its second position, to effect the high speed ratio through the transaxle by applying the clutch and releasing the brake, all of the oil from pump 174 flows directly to port 188a of valve 188 via conduit 178, passage 205c, and conduit 190. Valve 188 may be obtained from Fluid Controls, Inc., 8341 Tyler Blvd., Mentor, Ohio 44060. The valve provides a regulated pressure to port 188b of about 150 psi ($102N/cm^2$) and dumps or directs whatever oil flow is necessary to port 188c to maintain the pressure at port 188b. The oil dumped to port 188c is, in reality, substantially all of the oil flowing from pump 174 since oil flow to the clutch and brake occurs only during the short time period necessary to move the pistons of the clutch and brake. The oil at port 188c flows to conduits 182 and 184 via conduit 204, check valve 202, and conduit 186. When spool 205 is moved back to its first position, valve 188 allows the oil pressure acting on the clutch and brake to bleed or back flow to port 188a and then to the lubricating and cooling path via conduit 190, passage 205b, conduit 200, and check valve 198.

Pump 174 is prefereably of the constant volume type and is preferably driven by a mechanism independent of the prime mover motor 14 and the transaxle 16, e.g., an electric motor 212 connected to the pump via a driveshaft 214.

An independent drive arrangement for pump 174, such as electric motor 212, provides several advantages over a conventional drive driven by the prime mover or transaxle shafts since these shafts stop when the vehicle stops, seldom rotata at an optimum drive speed for the pump, and are reverse rotated when the vehicle direction is reversed. More specifically, an independent drive can: (1) run the pump when the vehicle is stopped, thereby providing oil flow for post-cooling of the prime mover and pressure for clutch and brake operation during vehicle start, whereas a conventional drive provides no flow for such purposes; (2) run the pump with optimum efficiency at optimum rpm's for all vehicle speeds and loads, thereby efficiently providing the needed oil flow for all vehicle speeds and loads, whereas a conventional drive, without some additional means such as a variable displacement pump, would inefficiently provide marginal oil flow at low vehicle speeds and far too much oil flow at high vehicle speeds; and (3) run the pump in one direction for both forward and reverse vehicle operation, whereas a conventionally driven pump would require additional means associated with either the drive or the pump to provide oil flow when the vehicle direction is reversed.

The preferred embodiments of the inventions have been disclosed for illustrative purposes. Many variations and modifications of the preferred embodiments are believed to be within the spirit of the inventions. For example, both clutch 84 and brake 86 could be spring applied or fluid applied; or clutch 84 could be spring applied and brake 86 fluid applied.

In this latter example, the high or direct drive speed ratio would be a comehome gear in the event of hydraulic system failure. The following claims are intended to cover the inventive portions of the preferred inventive embodiments and variations and modificiations within the spirit of the disclosed inventions.

What is claimed is:

1. In a ratio change transmission including shift means operative in response to the absence of a pressurized oil to shift the transmission to one ratio and operative in response to the presence of a pressurized oil to shift the transmission to another ratio; and improved hydraulic system for effecting said absence and presence and for lubricating and cooling said transmission; the improvement comprising:

a pump for delivering an oil flow; valve means receiving said oil flow, said valve operative in a first position to effect said absence and operative in a second position to effect said presence;

a first path connected to said valve means for directing said oil flow to said transmission for lubricating and cooling when said valve is in said first position, said path presenting a low resistance to said oil flow, whereby said pump delivers said oil flow at a relatively low pressure; and a second path connected to said valve means for directing said oil flow to said shift means when said valve means is in said second position, said second path presenting a greater resistance to said oil flow than said first path, whereby the oil pressure in said second path is greater than the oil pressure in first path.

2. The improvement of claim 1, further including:
a pressure regulating valve disposed in said second path and operative when said valve means is in said second position to maintain the oil in said second path at a predetermined pressure.

3. The improvement of claim 2, wherein said regulating valve includes;
a dump port and means operative to direct whatever portion of said oil flow from said pump is necessary to maintain said predetermined pressure in said second path; and said improvement further includes:
first conduit means connected to said dump port for directing the dumped oil flow to said first path.

4. The improvement of claim 3, further including:
a check valve disposed in said first conduit means for allowing oil flow from said dump port to said first path via said first conduit means and for preventing oil flow from said first path to said dump port via said first conduit means.

5. The improvement claim 1 or 2 further including:
means for bleeding the pressure in said second path in response to movement of said valve means from said second position to said first position.

6. The improvement of claim 5, wherein said bleed means includes:
second conduit means connected between said valve means and said first path; and
passage means in said valve means operative to connect said second path with said second conduit means when said valving means is in said first position.

7. The improvement of claim 6, further including:
a check valve disposed in said second conduit means for allowing oil flow from said valve means to said first path via said second conduit means and for preventing oil flow from said first path to said valve means via said second conduit means.

8. The improvement of claim 1, 2, 3, or 4, further including means for driving said pump independent of the rotational speed of said transmission.

9. The improvement of claim 1, 2, 3, or 4, further including lubricating passages of a prime mover connected to said first path.

10. The improvement of claim 9, wherein said prime mover is an electric motor.

11. The improvement of claim 10, further including means for driving said pump independent of the rotational speed of said transmission and said electric motor.

* * * * *